United States Patent [19]
Larsson

[11] 3,995,345
[45] Dec. 7, 1976

[54] CLEANING TOOLS
[76] Inventor: Stig Larsson, Box 5054, 581 10 Linkoping, Sweden
[22] Filed: June 12, 1975
[21] Appl. No.: 586,442
[52] U.S. Cl. .................................. 15/105; 15/111; 15/117; 15/143 R; 403/252
[51] Int. Cl.² ......................................... A47L 13/12
[58] Field of Search ........ 15/111, 113, 117, 143 R, 15/146, 105; 401/24; 403/252, 256, 261

[56] References Cited
UNITED STATES PATENTS
774,689 11/1904 McDermott ........................ 15/111

FOREIGN PATENTS OR APPLICATIONS
77,884 9/1949 Norway ............................. 403/261
121,072 3/1948 Sweden ............................. 403/252

Primary Examiner—Daniel Blum
Attorney, Agent, or Firm—Neil F. Markva

[57] ABSTRACT

A tool for cleaning dry and wet dirt has a handle carrying a Piassava type brush and a rubber scraping element or squeegee. The handle is secured to a flange having a coaxial extension fitting through an oblique hole in the brush head. The extension protrudes on the underside and is fitted with a wedge fastener. The rubber scraping element is carried by a bent plate secured to the topside of the brush head. This plate is apertured and grooved and engages non-rotatably with the flange extension.

8 Claims, 4 Drawing Figures

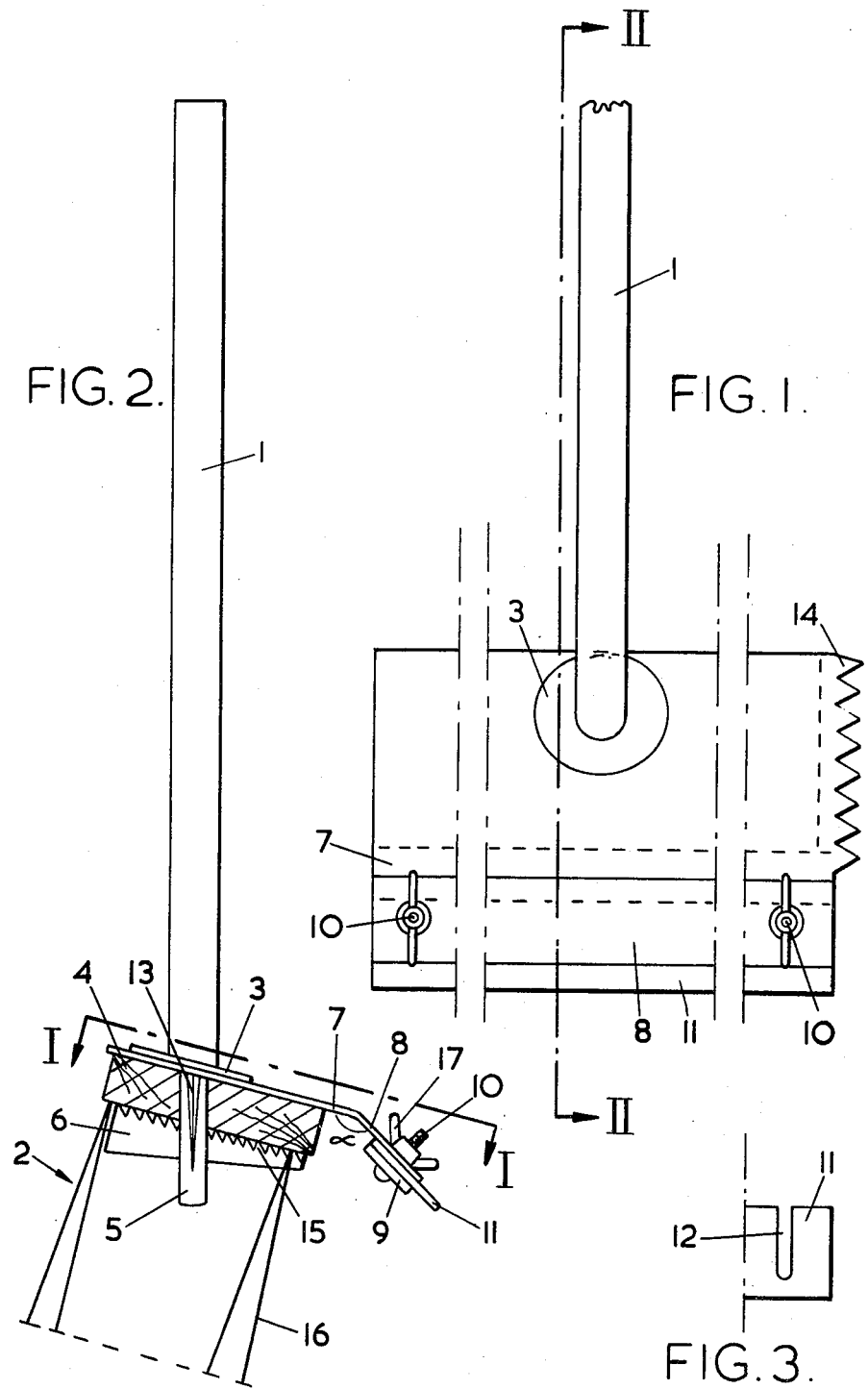

CLEANING TOOLS

It is well known to use brushes of Piassava type to clear dry dirt, such as, snow, sand, earth, glass splinters etc. off pavements and shopfloors for example. It is also well known to use the above mentioned brushes or rakes made of metal or metal with rubber plates for clearing of wet dirt, such as manure from the floors of barns and pigstyes.

The above mentioned brushes of Piassava type, usually referred to as Piassava-brooms, usually consist of a flat, rectangular wooden brush head which is set with the bristles of Piassava type, and the wooden brush head is, in its middle, provided with a diagonal perpendicular handle hole at a right angle to its length wherein a handle shaft made of wood is inserted. When the brush is used for clearing wet dirt, the handle draws this towards itself around the end of the handle shaft and will soon become rotten as well as the wood around the handle hole. This often happens before the brush bristles are worn out, thereby both brush and handle have to be thrown away sooner than necessary.

Neither has there been a satisfactory implement which could combine all the above mentioned cleaning elements. When one had to perform the different types of cleaning operations, one has had to bring two or three different tools.

The present invention can provide a cleaning tool which in itself includes all the above mentioned elements and functions and whereby the brush will not have to be thrown away until the bristles are worn out and can then easily be replaced by a new one.

The tool according to the invention has features of shape and characteristics as defined in the appended patent claims.

BRIEF DESCRIPTION OF DRAWINGS

The invention is made clear by the accompany drawings, in which:

FIG. 1 shows one form of a tool according to the invention seen from above.

FIG. 2 shows the same tool in section along the line II—II in FIG. 1.

FIG. 3 shows a part of a rubber plate 11.

DESCRIPTION OF SPECIFIC EMBODIMENTS

Figure 4:
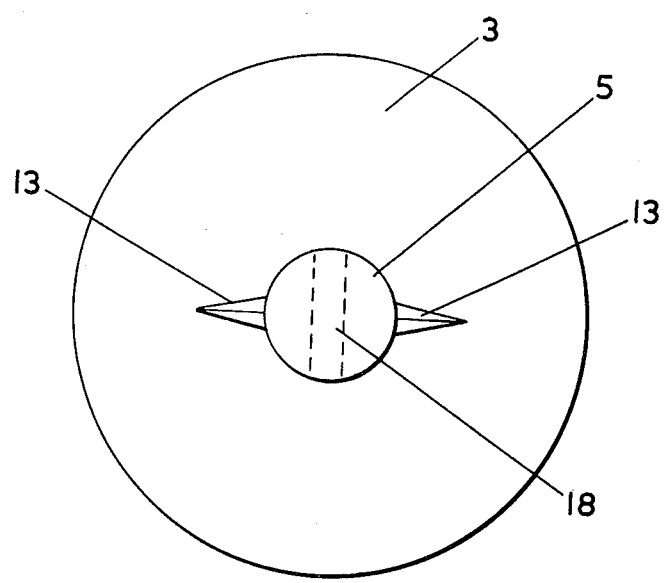
FIG. 4 shows a flange 3, seen from underneath.

A shaft handle 1 is provided with a circular flange 3 at its lower end. Flange 3 is rigidly fastened onto the handle so that the angle of the handle 1 towards the flange 3 is the same as the angle a hole for the handle of the Piassava brush 2 in a wooden brush head 4 makes to the topside of the wooden brush head 4. The flange 3, on the side which is presented away from the handle 1, is provided with a protruding extension 5 which is so arranged and dimensioned as to be placed through the handle hole and to protrude between the brush bristles 16 on the underside of the wooden brush head 4. The protruding part of the extension 5 is provided with an axial, diametrical slit 18 which is designed to accommodate a wedge 6 which can fix the wooden brush head 4 to lie against the underside of the flange 3. The wedge 6 is preferably provided with teeth 15 on its side that lies against the wooden brush head 4, and the teeth 15 are adapted to dig into the wooden brush head 4 when the wedge 6 is driven into place thereby to prevent the wedge 6 from becoming loose and falling out. The extension 5 is provided with at least one and preferably two wedge shaped, sharp edged radial extensions 13 rigidly connected at the upper end with flange 3 and preferably diametrically arranged. The extensions 13 extend longitudinally along and radially outwardly from the extension 5. As shown, extensions 13 have a sharp-edged configuration designed to cut into the sides of the handle hole in the wooden brush head 4 when the wedge 6 is driven into place, thereby to prevent the brush 2 from turning in relation to the flange 3.

It has proved advantageous to arrange, between the flange 3 and the wooden brush head 4, a rectangular plate 7 which is provided with V-shaped grooves corresponding to the extensions 13. The wedge-shaped extensions 13 project from flange 3 and are effective to fit with mininmal penetration into said V-shaped groove configuration of said plate 7. This plate 7, along the lower long edge of the wooden brush head 4, is provided with a protruding part or portion 8 which is preferably bent downwards so that its outside part together with the main part of the plate 7 makes an angle $\alpha$ of 130° – 165°, preferably 145°. Alongside the free edge section of protruding portion 8 there is a metal strip 9 which is so arranged as to be pressed against and maintained against a rubber plate 11 by, for example, clamping screws 10 and wing nuts 17.

This plate 11 is preferably provided, opposite the screws 10, with open rectangular slits 12 extending from its upper longside.

It has also proved advantageous to provide the plate 7 with protruding teeth 14 along one of the short sides of the plate 7.

The tool is used in the following way:

To clean dry dirt off pavements, outside staircases etc. it is advisable to use th Piassava brush 2 in the normal way. The wedge 6 holds the brush 2 in a fixed position and thereby good cleaning results are obtained.

To clean away wet dirt, it is adviseable to turn the tool so that the squeegee-like portion which includes the rubber plate 11 is facing downwards and when most of the dirt is cleared away to continue with the brush 2.

When clearing away snow, it is advisable to start with the rubber plate 11 and then continue with the brush 2. If the snow is packed or if there is ice, it would be best to start cutting up the ice and the snow by means of the teeth 14.

When cleaning manure in barns, it would be best to start with the rubber plate 11 and when necessary continue with the brush 2.

While here only one form of device has been shown and described by way of example, other forms and modifications can of course exist within the framework of this invention.

I claim:

1. A tool designed for cleaning dry and wet dirt off pavements, shopfloors, sheds and the like, said tool comprising:
   a. a brush having bristles and a head with a flat topside and a hole therethrough,
   b. a handle disposed in said hole at an obtuse angle with respect to said flat topside,
   c. said handle including a longitudinal shaft having a flange disposed at an angle with said shaft which angle corresponds to said angle between the handle and the flat topside, d. said handle including a first extension extending from the underside of such flange and coaxially with respect to said shaft,
e. said first extension projecting through said hole and having a portion protruding from the underside of said head,
f. said protruding portion including an axial slit extending therethrough and accommodating a wedge which fixes the brush head against the underside of said flange, and
g. a plate disposed between the flange and the topside of the brush head,
h. said plate including a longitudinal edge which faces the obtuse angle of the handle with the brush head and protrudes beyond said brush head,
i. said plate including a first opening therethrough having a portion corresponding to that of the hole in the brush head and another portion having a V-shaped groove configuration with edges that diverge to said first opening portion,
j. said handle including at least one wedge-shaped extension connecting along one side to said first extension and along a second side to the underside of the flange,
k. said wedge-shaped extension projecting from the flange being effective to fit with minimal penetration into said V-shaped groove configuration in said plate.

2. A tool as defined in claim 1 wherein the wedge-shaped extension has a V-shaped edge which is presented way from said first extension.

3. A tool as defined in claim 2 wherein the cross-sectional shape of the wedge-shaped extension in a section taken along a plane extending through the edge of the wedge-shaped extension and the longitudinal shaft of the handle is triangular.

4. A tool as defined in claim 1 wherein the protruding portion of the plate is bent downwardly with respect to the bristles so that its outside part together with the main part of the plate makes an angle ($\alpha$) of 130°–165°.

5. A tool as defined in claim 1 wherein the protruding portion of the plate has a free edge section and a metal strip pressed against a rubber plate with a fastening means.

6. A tool as defined in claim 5 wherein the fastening means comprises screws, and the rubber plate opposite the screws includes rectangular slits extending from its upper longside.

7. A tool as defined in claim 6 wherein there are two wedge-shaped extensions which are in a diametrical arrangement with respect to said first extension.

8. A tool as defined in claim 1 wherein the plate has protruding teeth along at least one of its sides.

* * * * *